53. HARVESTERS.
378
H. HAYNES.
Horse Rake.
No. 73.
A. 1. Patented Feb. 12, 1845.
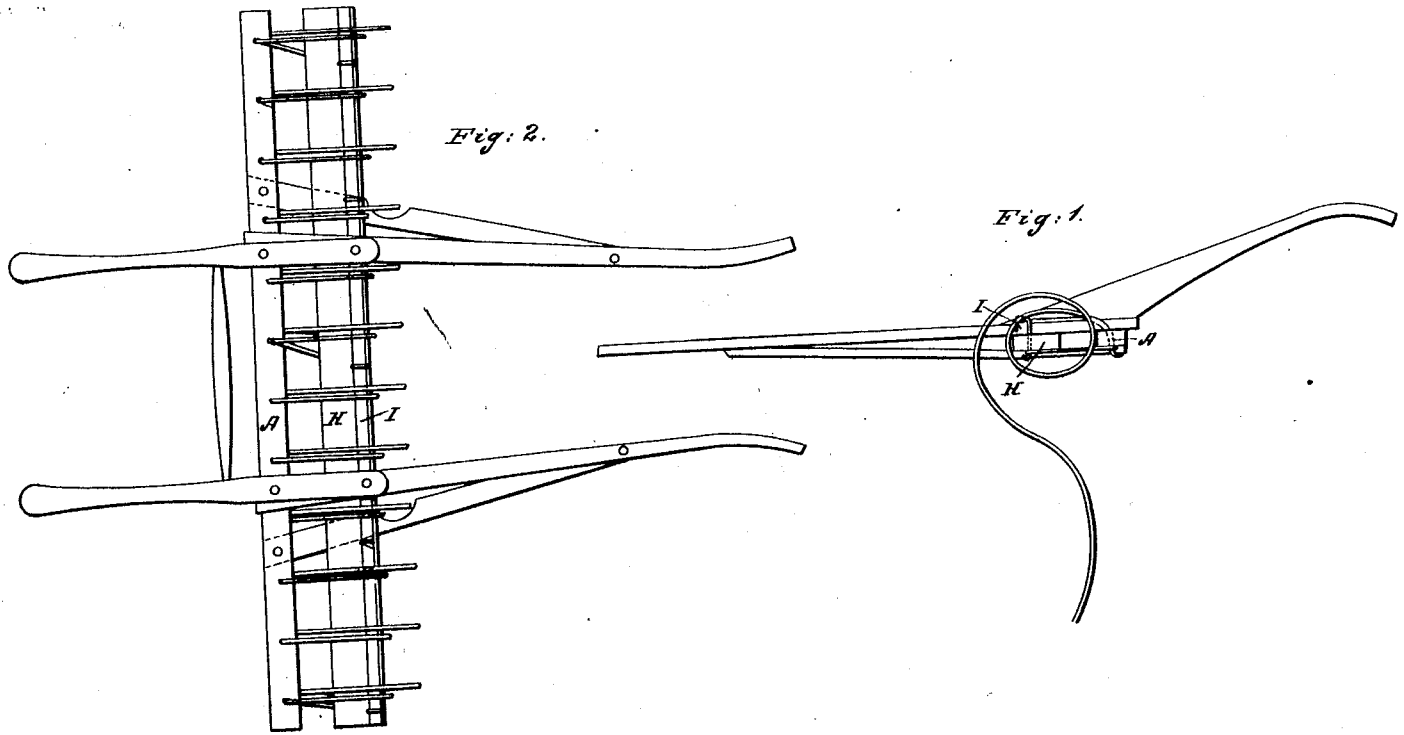
N. PETERS. Photo-Lithographer, Washington, D. C.